US012576914B2

(12) United States Patent　　　　(10) Patent No.:　US 12,576,914 B2
Tandon　　　　　　　　　　　　　　(45) Date of Patent:　　Mar. 17, 2026

(54) SIDE STRUCTURE FOR A MOTOR VEHICLE

(71) Applicant: ArcelorMittal, Luxembourg (LU)

(72) Inventor: Gagan Tandon, Canton, MI (US)

(73) Assignee: ArcelorMittal, Luxembourg (LU)

( * ) Notice: Subject to any disclaimer, the term of this patent is extended or adjusted under 35 U.S.C. 154(b) by 417 days.

(21) Appl. No.: 18/027,992

(22) PCT Filed: Sep. 16, 2021

(86) PCT No.: PCT/IB2021/058448

§ 371 (c)(1),
(2) Date: Mar. 23, 2023

(87) PCT Pub. No.: WO2022/064331

PCT Pub. Date: Mar. 31, 2022

(65) Prior Publication Data

US 2024/0025482 A1　　　Jan. 25, 2024

(30) Foreign Application Priority Data

Sep. 25, 2020　　(WO) .................. PCT/IB2020/058990

(51) Int. Cl.
　B62D 25/02　　　(2006.01)
　B62D 25/04　　　(2006.01)
　B62D 25/06　　　(2006.01)
(52) U.S. Cl.
　CPC .............. B62D 25/02 (2013.01); B62D 25/04 (2013.01); B62D 25/06 (2013.01)
(58) Field of Classification Search
　CPC ........ B62D 25/02; B62D 25/06; B62D 25/04; B62D 25/08; B62D 29/00; B62D 29/007; B62D 27/023

USPC ........ 296/203.1–4, 193.01, 5, 6, 209, 29, 30
See application file for complete search history.

(56) References Cited

U.S. PATENT DOCUMENTS

| | | | |
|---|---|---|---|
| 6,988,763 B2 * | 1/2006 | Saeki ................... | B62D 21/157 |
| | | | 296/203.03 |
| 2005/0189790 A1 * | 9/2005 | Chernoff .............. | B62D 25/081 |
| | | | 296/193.05 |
| 2006/0097549 A1 | 5/2006 | Fischer et al. | |
| 2010/0327630 A1 | 12/2010 | Klimek et al. | |

(Continued)

FOREIGN PATENT DOCUMENTS

| | | |
|---|---|---|
| CN | 101934822 A | 1/2011 |
| CN | 210912619 U | 7/2020 |

(Continued)

OTHER PUBLICATIONS

JP7684626 Text (Year: 2025).*
Search Report of PCT/IB2021/058448 of Nov. 22, 2021 and International Report on Patentability.

*Primary Examiner* — Dennis H Pedder
(74) *Attorney, Agent, or Firm* — Davidson Kappel LLC

(57)　　　　　　ABSTRACT

Side structure (1) for a motor vehicle (3) including an inner and outer frame (11, 13) each forming a closed ring and having two openings corresponding to the front and rear doors (8, 10), wherein the inner and outer frames (11, 13) are each formed by hot stamping respectively an inner and an outer frame blank (111, 113), each being a single tailor welded blank made of steel and wherein the inner and outer frames (11,13) are assembled to form a hollow volume (7) between them.

17 Claims, 8 Drawing Sheets

(56) References Cited

U.S. PATENT DOCUMENTS

| | | | |
|---|---|---|---|
| 2011/0233970 | A1 | 9/2011 | Nagai et al. |
| 2014/0023879 | A1 | 1/2014 | Shibao et al. |
| 2014/0319877 | A1 | 10/2014 | Honda et al. |
| 2021/0221439 | A1 | 7/2021 | Meca et al. |

FOREIGN PATENT DOCUMENTS

| | | | | |
|---|---|---|---|---|
| DE | 19946013 | A1 | 3/2001 | |
| JP | S5599973 | U | 7/1980 | |
| JP | 2001287666 | A | 10/2001 | |
| JP | 2001301652 | A | 10/2001 | |
| JP | 2011195107 | A | 10/2011 | |
| JP | 2013108183 | A | 6/2013 | |
| JP | 5764667 | B2 | 8/2015 | |
| JP | 2018527457 | A | 9/2018 | |
| JP | 2018527461 | A | 9/2018 | |
| JP | 2019 093813 | A | 6/2019 | |
| JP | 7684626 | B2 * | 5/2025 | ............ C22C 38/60 |
| WO | WO2011023499 | A1 | 3/2011 | |
| WO | WO2020002335 | A1 | 1/2020 | |

* cited by examiner

SIDE STRUCTURE FOR A MOTOR VEHICLE

The present invention relates to a side structure for a motor vehicle.

BACKGROUND

Car makers are submitted to the ever more demanding requirements of increasing the passive safety of vehicles, lowering the weight of the vehicle to minimize greenhouse gas emissions in case of internal combustion engines or increase the vehicle's driving range in case of electric vehicles, while keeping production costs low and productivity rates high.

The side structure of a motor vehicle can be seen as the side wall separating the vehicle occupants from the outside and shielding them from any intrusion in the case of an accident. It is also one of the main structural elements linking the front and rear crash management systems and is essential to the good transmission and absorption of efforts coming from said systems.

As such, the side structure of a motor vehicle is a key structural element of the vehicle and contributes to the safety of the occupants in case of lateral impacts, front and rear impacts, as well as in case of a roll over, whereby the vehicle rolls over on its side and/or roof due to an accident or a loss of control in a curb. Furthermore, in the case of an electric vehicle having a battery pack located under the floor panel of the vehicle, the side structure is also involved in protecting the battery pack from lateral shocks.

The side structure, consisting of numerous individual parts, makes up a significant mass of the vehicle's body. It also involves costly manufacturing processes: multiple forming operations and assembly steps to obtain the finished structure.

One example of such side structure in which the parts making up the structure lying just below the outer skin of the vehicle are made using a single tailor welded blank is disclosed in JP5764667B2.

SUMMARY OF THE INVENTION

An object of the present invention is to address the combined challenges of safety, weight reduction and high productivity by providing a side structure having a reduced number of parts, an excellent safety performance and an optimized total weight.

To this end the present invention relates to:

A side structure for a motor vehicle comprising an inner frame and an outer frame, wherein said inner and outer frames each comprise respectively:
- a roof rail portion, corresponding to the top part of the side structure which is bordering a roof of the vehicle,
- a rocker panel portion, corresponding to the bottom part of the side structure, which is bordering a floor panel of the vehicle,
- an A-pillar upper portion, extending from the front end of said roof rail portion and corresponding to the part of the side structure which is bordering a windshield of the vehicle,
- an A-pillar lower portion, extending from said A-pillar upper portion down to said rocker panel portion,
- a B-pillar upper portion, extending in an elevation direction from said roof rail portion in between front and rear doors down to the level of the windows of said front and rear doors,

- a B-pillar lower portion, extending from said B-pillar upper portion down to said rocker panel portion,
- a C-pillar lower portion, extending from the rear end of said rocker panel portion behind the rear door and up to the level of the rear door window in the elevation direction,
- a C-pillar upper portion, extending from said C-pillar lower portion up to said roof rail portion, wherein said inner and outer frames each form a closed ring having two openings corresponding to the front and rear doors, wherein said inner and outer frames are each formed by hot stamping respectively an inner and an outer frame blank, said inner and outer frame blanks each being a single blank made of steel, wherein the inner and outer frame blanks are tailor welded blanks composed respectively of n inner sub-blanks and m outer sub-blanks, n and m being integers strictly greater than 1, wherein at least two inner sub-blanks have a different thickness before hot stamping and at least two inner sub-blanks have a different tensile strength after hot stamping, wherein at least two outer sub-blanks have a different thickness before hot stamping and at least two outer sub-blanks have a different tensile strength after hot stamping, and wherein said inner and outer frames are assembled to form a hollow volume between them.

According to other optional features of the side structure according to the invention, considered alone or according to any possible technical combination:

the inner and outer frame blanks each comprise respectively at least one inner and outer sub-blank which is coated with an aluminum based metallic coating.

the outer frame blank comprises at least one outer sub-blank, which is coated with an aluminum based metallic coating, comprising from 2.0 to 24.0% by weight of zinc, from 1.1 to 12.0% by weight of silicon, optionally from 0 to 8.0% by weight of magnesium, and optionally additional elements chosen from Pb, Ni, Zr, or Hf, the content by weight of each additional element being inferior to 0.3% by weight, the balance being aluminum and optionally unavoidable impurities.

the inner frame blank is composed of a series of n inner sub-blanks, wherein each inner sub-blank has a thickness before hot stamping $t_i$ and an ultimate tensile strength after hot stamping $TS_i$, wherein the product $P_i = t_i * TS_i$ is computed for each inner sub-blank, said inner frame blank comprising:
  a minimum resistance inner sub-blank having a product $P_{min}$, which is the minimum of all products $P_i$ of said n inner sub-blanks,
  a maximum resistance inner sub-blank having a product $P_{max}$, which is the maximum of all products $P_i$ of said n inner sub-blanks,
  and wherein $P_{max} > 2*P_{min}$.

the outer frame blank is composed of a series of m outer sub-blanks, wherein each outer sub-blank has a thickness before hot stamping $t_i$ and an ultimate tensile strength after hot stamping $TS_i$, wherein the product $P_i = t_i * TS_i$ is computed for each outer sub-blank, said outer frame blank (113) comprising:
  a minimum resistance outer sub-blank having a product $P_{min}$, which is the minimum of all products $P_i$ of said m outer sub-blanks, a maximum resistance outer sub-blank having a product Pmax, which is the maximum of all products Pi of said m outer sub-blanks, and wherein Pmax>2*Pmin.

the inner frame blank comprises at least one inner sub-blank which comprises an emissivity increasing top layer on at least one side.

the outer frame blank comprises at least one outer sub-blank which comprises an emissivity increasing top layer on at least one side.

the inner frame blank comprises at least one inner sub-blank made of a press-hardening steel having an ultimate tensile strength after hot stamping above 1800 MPa.

the outer frame blank comprises at least one outer sub-blank made of a press-hardening steel having an ultimate tensile strength after hot stamping above 1800 MPa.

the inner frame blank comprises at least one inner sub-blank made of a press-hardening steel having a yield strength after hot forming comprised between 700 and 950 MPa, an ultimate tensile strength after hot forming comprised between 950 MPa and 1200 MPa and a bending angle after hot forming above 75°.

the outer frame blank comprises at least one outer sub-blank made of a press-hardening steel having a yield strength after hot forming comprised between 700 and 950 MPa, an ultimate tensile strength after hot forming comprised between 950 MPa and 1200 MPa and a bending angle after hot forming above 75°.

the outer frame blank comprises at least one metallic patch.

at least one metallic patch of the outer frame blank comprises an emissivity increasing top layer.

the outer frame blank comprises at least one weld seam reinforcing patch, wherein said weld seam reinforcing patch is applied on an area which comprises a weld seam.

at least one weld seam reinforcing patch of the outer frame blank comprises an emissivity increasing top layer.

the thickness of the interdiffusion layer in the Aluminum based metallic coated areas of the inner frame is comprised between 3 microns and 15 microns.

the thickness of the interdiffusion layer in the Aluminum based metallic coated areas of the outer frame is comprised between 3 microns and 15 microns.

BRIEF DESCRIPTION OF THE DRAWINGS

Other aspects and advantages of the invention will appear upon reading the following description, given by way of example, and made in reference to the appended drawings, wherein.

DETAILED DESCRIPTION

In the following description, the terms "upper", "lower", "front", "rear", "transverse" and "longitudinal" are defined according to the usual directions of a mounted vehicle. More particularly, the terms "upper", "lower", "up", "down", "bottom" and "top" are defined according to the elevation direction of the vehicle, the terms "front", "rear", "forward", "backward" and "longitudinal" are defined according to the front/rear direction of the vehicle and the term "transverse" is defined according to the width of the vehicle. The term "height" refers to the distance between two points, lines, surfaces or volumes as measured in the horizontal direction.

A blank of steel refers to a flat sheet of steel, which has been cut to any shape suitable for its use. A blank has a top and bottom face, which are also referred to as a top and bottom side or as a top and bottom surface. The distance between said faces is designated as the thickness of the blank. The thickness can be measured for example using a micrometer, the spindle and anvil of which are placed on the top and bottom faces. In a similar way, the thickness can also be measured on a formed part.

The yield strength, the ultimate tensile strength and the uniform and total elongation are measured according to ISO standard ISO 6892-1, published in October 2009.

The bending angle is measured according to the VDA-238 bending standard. For a same material, the bending angle depends on the thickness. For the sake of simplicity, the bending angle values of the current invention refer to a thickness of 1.5 mm. If the thickness is different than 1.5 mm, the bending angle value needs to be adjusted by the following calculation where $\alpha_{1.5}$ is the bending angle at 1.5 mm, t is the thickness, and at is the bending angle for thickness t:

$$\alpha_t = \frac{\alpha_{1.5} \times \sqrt{1.5}}{\sqrt{t}}$$

The bending angle of a part is a way to measure the ability of the part to resist deformation without the formation of cracks.

Emissivity is the relative power of a surface to emit heat by radiation. It represents the ratio of the radiant energy emitted by a surface to that emitted by a blackbody at the same temperature, and is a value comprised between 0 and 1. The higher the emissivity of the surface of a blank, the more it will absorb heat by radiation and therefore the easier it will be to heat it using a radiant furnace.

Figure 1:
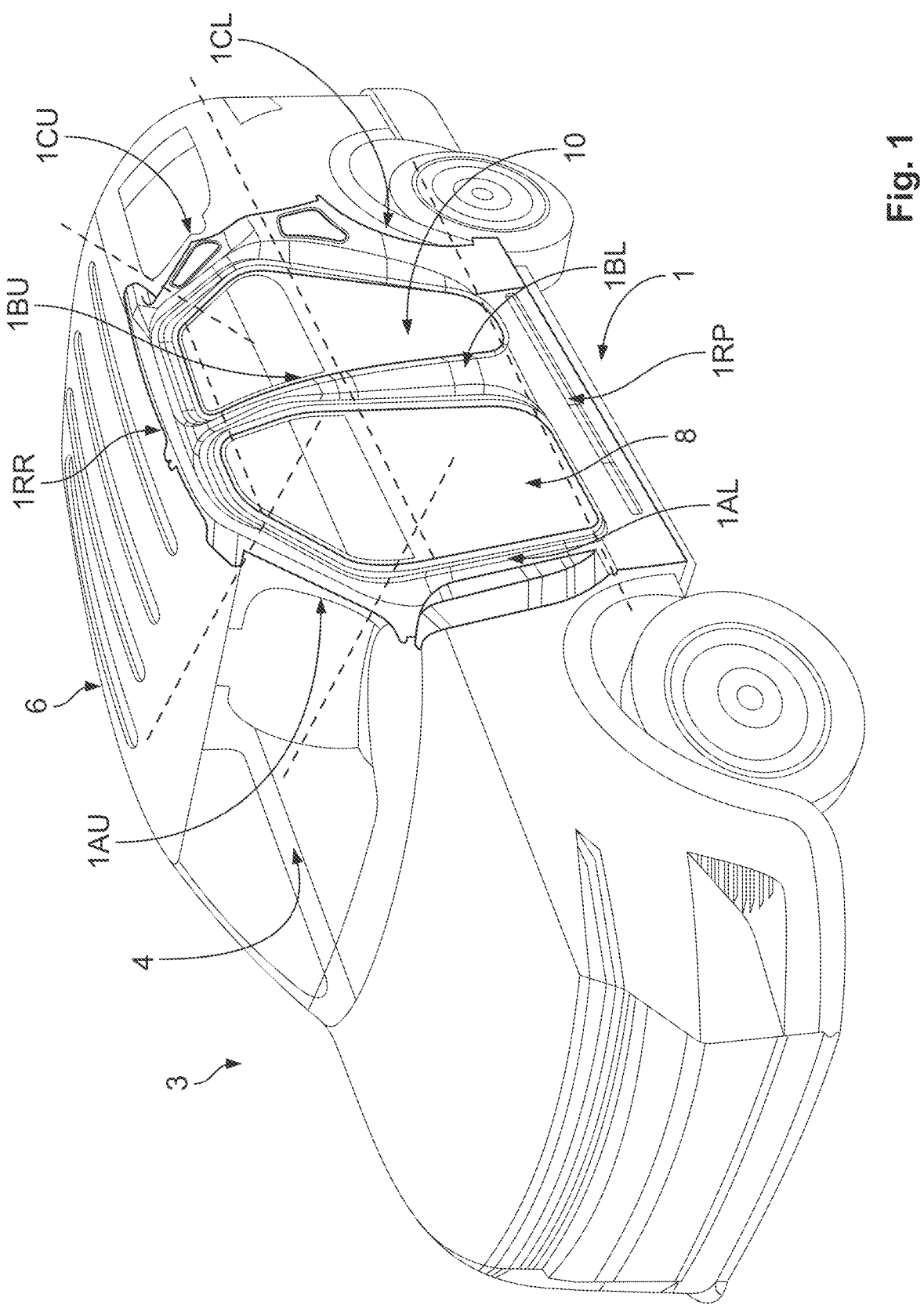
FIG. 1 is a first overall perspective view of a vehicle according to the invention
Figure 2:
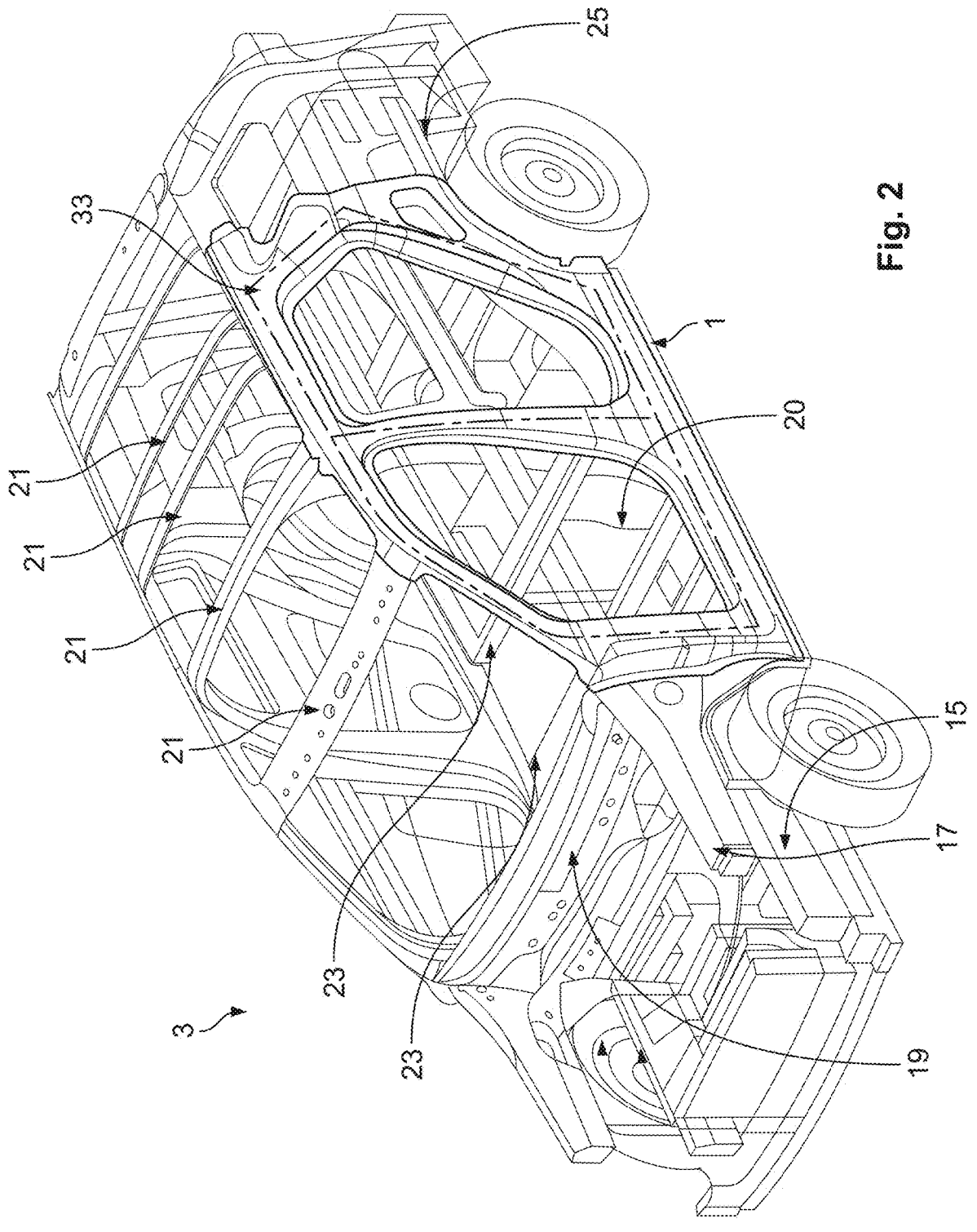
FIG. 2 is a second overall perspective view of a vehicle according to the invention in which the outer skin of the vehicle has been made transparent in order to see the underlying structural parts

Referring to FIGS. 1 and 2, a side structure 1 of a motor vehicle 3 is described. The outer skin of the vehicle is made transparent for clarity's sake on FIG. 2, the side structure 1 lies beneath the skin. The motor vehicle 3 can be any type of passenger vehicle comprising at least a front and a rear set of doors: compact, sedan, Sport Utility Vehicle etc. The described side structure is essentially the same whatever the category of vehicle. Furthermore, the powertrain of said motor vehicle can be a combustion engine, electrical motors, fuel cells or any type of hybrid system.

Figure 3:
FIG. 3 is an exploded perspective view of a side structure according to the invention

FIG. 3 is an exploded view of the side structure 1 according to the present invention and of a body side outer 5. The body side outer 5 makes up the outer skin of the vehicle, and has an essentially esthetic purpose, while the side structure 1 has a structural purpose guaranteeing crash resistance and overall rigidity of the body.

Referring to FIGS. 1 and 2, the side structure 1 comprises a plurality of portions, delimited by dashed lines on FIG. 1, which will be described here below:

a roof rail portion 1RR, corresponding to the top part of the side structure 1 bordering a roof 6. The roof rail portion 1RR is connected to roof cross beams 21 and plays an important role in the torsional rigidity of the vehicle as well as in the resistance of the vehicle structure to a roll over.

a rocker panel portion 1RP, corresponding to the bottom part of the side structure 1, bordering the floor panel 20 of the vehicle. Said rocker panel portion 1RP is connected in the transverse direction to floor cross members 23. It is connected longitudinally at its front end to a front cross member 15, possibly via intermediate parts. It is connected longitudinally at its rear end to a rear cross member 25, possibly via intermediate parts. The rocker panel portion 1RP is involved in preventing intrusion and absorbing energy in case of lateral crashes impacting the passenger cabin. It is also instrumental in preventing intrusion and absorbing energy in case of a front or rear crash, thanks to its connection to the front and rear side members 15, 25. It is particularly important in the case of a front or rear crash impacting only part of the vehicle width, such as the Insurance Institute for Highway Safety's (IIHS) Small Overlap Rigid Barrier (SORB) crash, in which a vehicle is impacted with only 25% overlap in the width of a vehicle by a rigid barrier moving at 64.4 km/h. In such a configuration, only part of the front or rear crash management system is involved in resisting the impact. The side structure 1, which is connected to the front and rear member 15, 25 at its rocker panel portion 1RP will play an important role in reinforcing the resistance on the vehicle in such cases, picking up part of the crash energy, resisting intrusion, protecting the occupants and transmitting the crash energy to other structural members of the vehicle. In the case of an electric or hybrid vehicle having a battery pack located under the floor panel 20 (battery not depicted in the figures), the rocker panel portion 1RP also plays a role in protecting the battery pack both from intrusions in case of a lateral impact and from deformations in case of a front or rear impact.

an A-pillar upper portion 1AU, corresponding to the part of the side structure 1 bordering a windshield 4. Said A-pillar upper portion 1AU plays an important role in resisting, absorbing and transmitting crash energy in the case of a front impact and is also important in guaranteeing overall vehicle torsional rigidity.

an A-pillar lower portion 1AL, extending from said A-pillar upper portion 1AU down to said rocker panel portion 1RP. In the longitudinal direction, the A-pillar lower portion 1AL is connected to the front crash management system, such as a part commonly referred to as the shotgun 17. As such it plays a key role in the transmitting, absorbing and resisting crash energy in the case of a front crash in particular in the case of a small overlap crash, as was described above for the rocker panel portion 1RP. In the transverse direction, the A-pillar lower portion 1AL is connected to transverse parts, such as the dash panel 19 and is instrumental in resisting intrusion into the passenger compartment in case of lateral crashes, and in transmitting and absorbing the efforts generated by lateral crashes to the rest of the structure via said transverse parts.

A B-pillar upper portion 1BU, extending in an elevation direction from said roof rail portion 1RR in between front and rear doors 8, 10 down to the level of the windows of said front and rear doors 8, 10 in an elevation direction. The B-pillar upper portion 1BU plays a key anti-intrusion role in case of a lateral impact. In the elevation direction, it is generally located at the level of the vital organs of the occupants (upper body) and must therefore efficiently prevent intrusion into the compartment to protect the occupants' lives.

A B-pillar lower portion 1BL, extending from said B-pillar upper portion 1BL down to said rocker panel portion 1RP. The B-pillar lower portion 1BL is involved in preventing intrusion and absorbing energy in case of lateral crashes impacting the middle and front end of the passenger cabin.

A C-pillar lower portion 1CL, extending from the rear end of said rocker panel portion 1RP behind the rear door 10 and up to the level of the rear door 10 window in the elevation direction. The C-pillar lower portion 1CL is involved in preventing intrusion and absorbing energy in case of lateral crashes impacting the rear of the passenger cabin. It is also instrumental in diffusing and transmitting crash energy to the rest of the vehicle's structure in case of a rear impact.

A C-pillar upper portion 1CU, extending from said C-pillar lower portion 1CL up to said roof rail portion 1RR. The C-pillar upper portion 1CU is involved in preventing intrusion and absorbing energy in case of lateral crashes impacting the rear of the passenger cabin. It is also instrumental in diffusing and transmitting crash energy to the rest of the vehicle's structure in case of a rear impact.

The above described side structure 1 forms a closed ring around the side of the vehicle 3 with two openings corresponding to the front and rear doors 8, 10.

Figure 6:
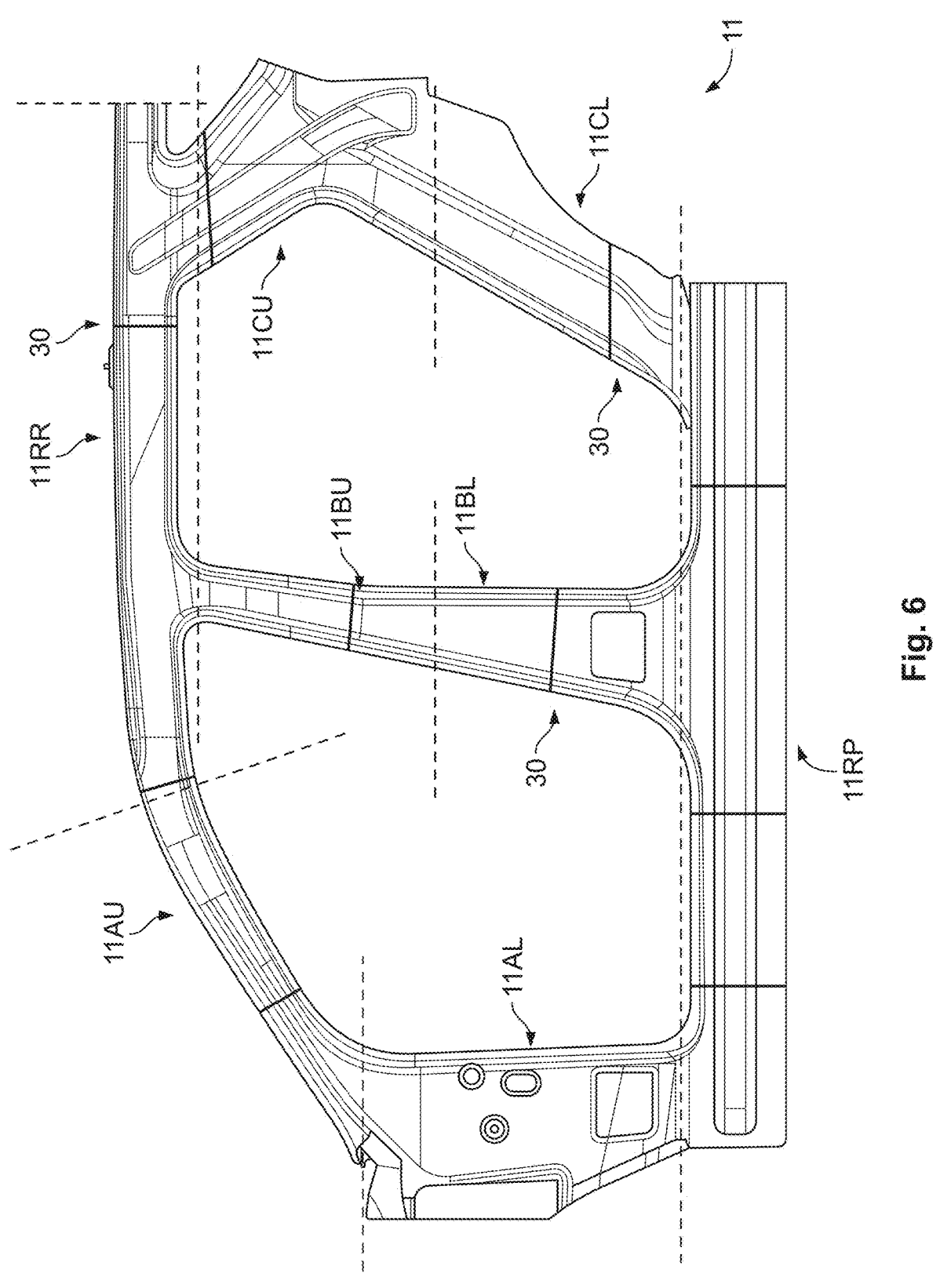
FIG. 6 is a top view of an inner frame according to the invention
Figure 7:
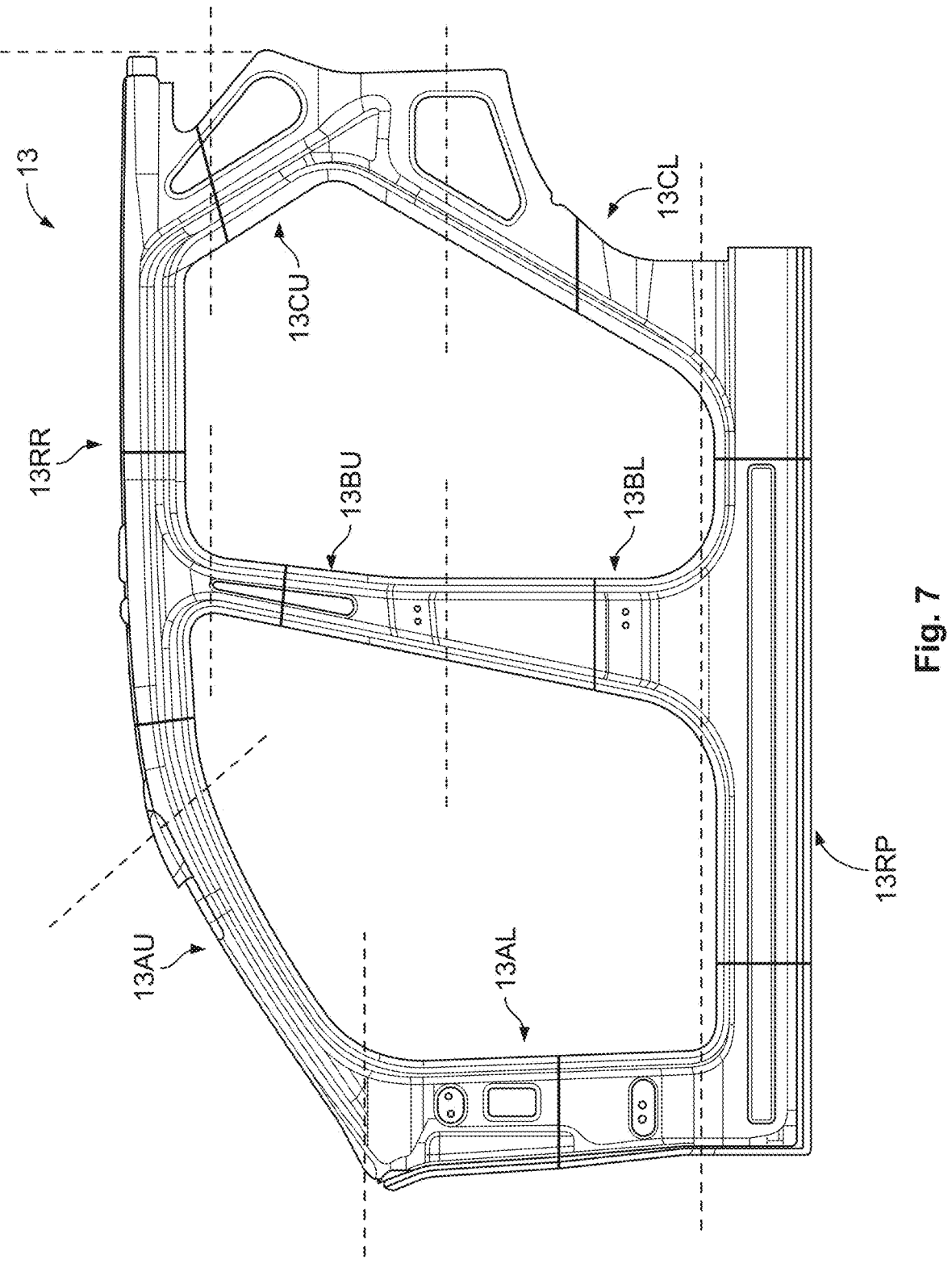
FIG. 7 is a top view of an outer frame according to the invention

Referring to FIG. 3, the side structure 1 according to the present invention is formed by the association of an inner frame 11 and an outer frame 13. The inner frame 11 is located closest to the passenger compartment, the outer frame 13 is located closest to the outside of the vehicle. Referring to FIGS. 6 and 7, each of the above described side structure portions 1RR, 1AU, 1AL, 1RP, 1CL, 1CU, 1BL, 1BU corresponds to an associated portion of the inner and outer frames, delimited on FIGS. 6 and 7 by dashed lines, respectively 11RR, 11AU, 11AL, 11RP, 11CL, 11CU, 11BL, 11BU and 13RR, 13AU, 13AL, 13RP, 13CL, 13CU, 13BL, 13BU. The inner and outer frames 11, 13 each form a closed ring around the side of the vehicle 3 with two openings corresponding to the front and rear doors 8, 10.

Figure 4:
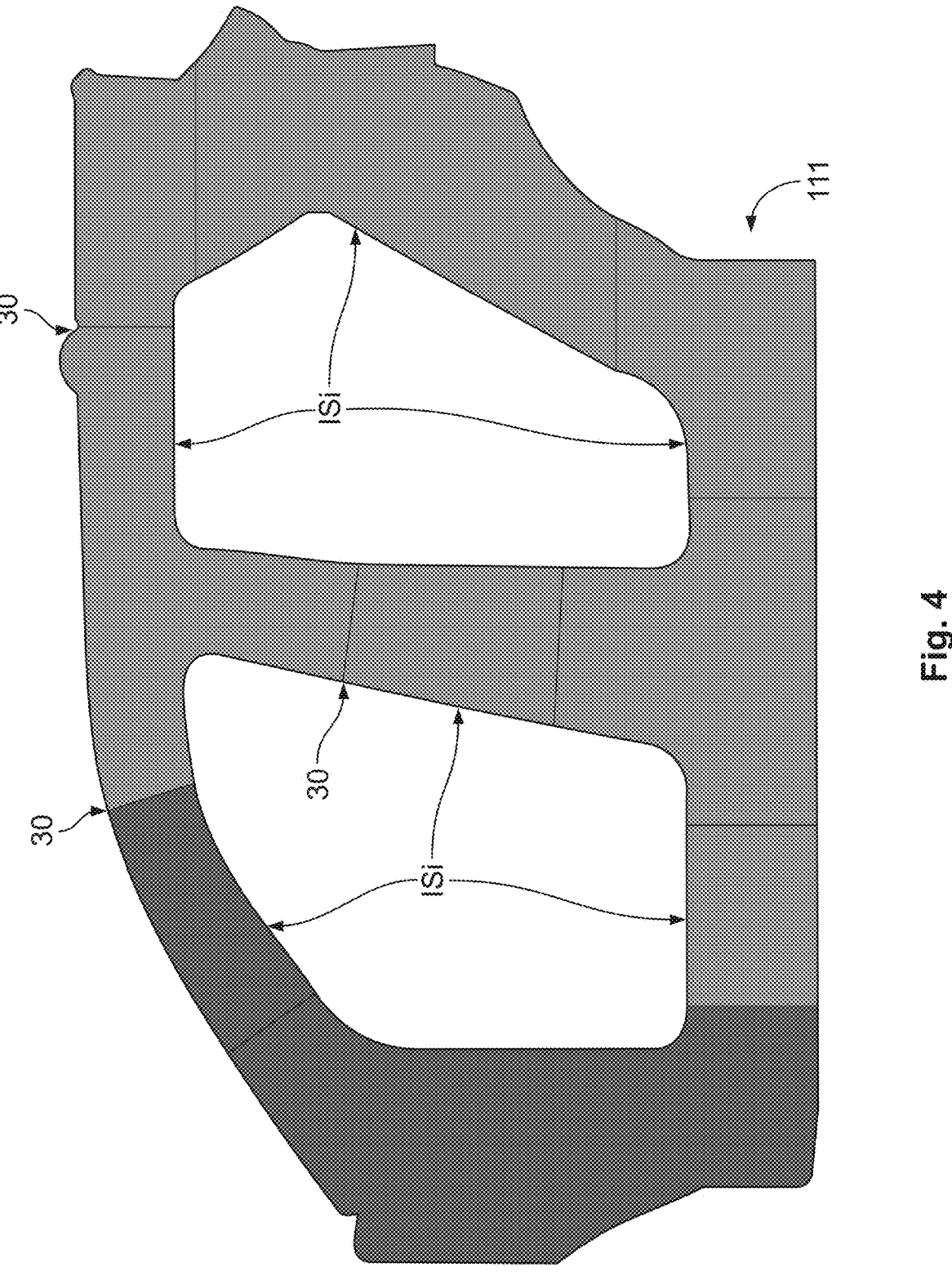
FIG. 4 is a top view of a blank used to form an inner frame according to the invention
Figure 5:
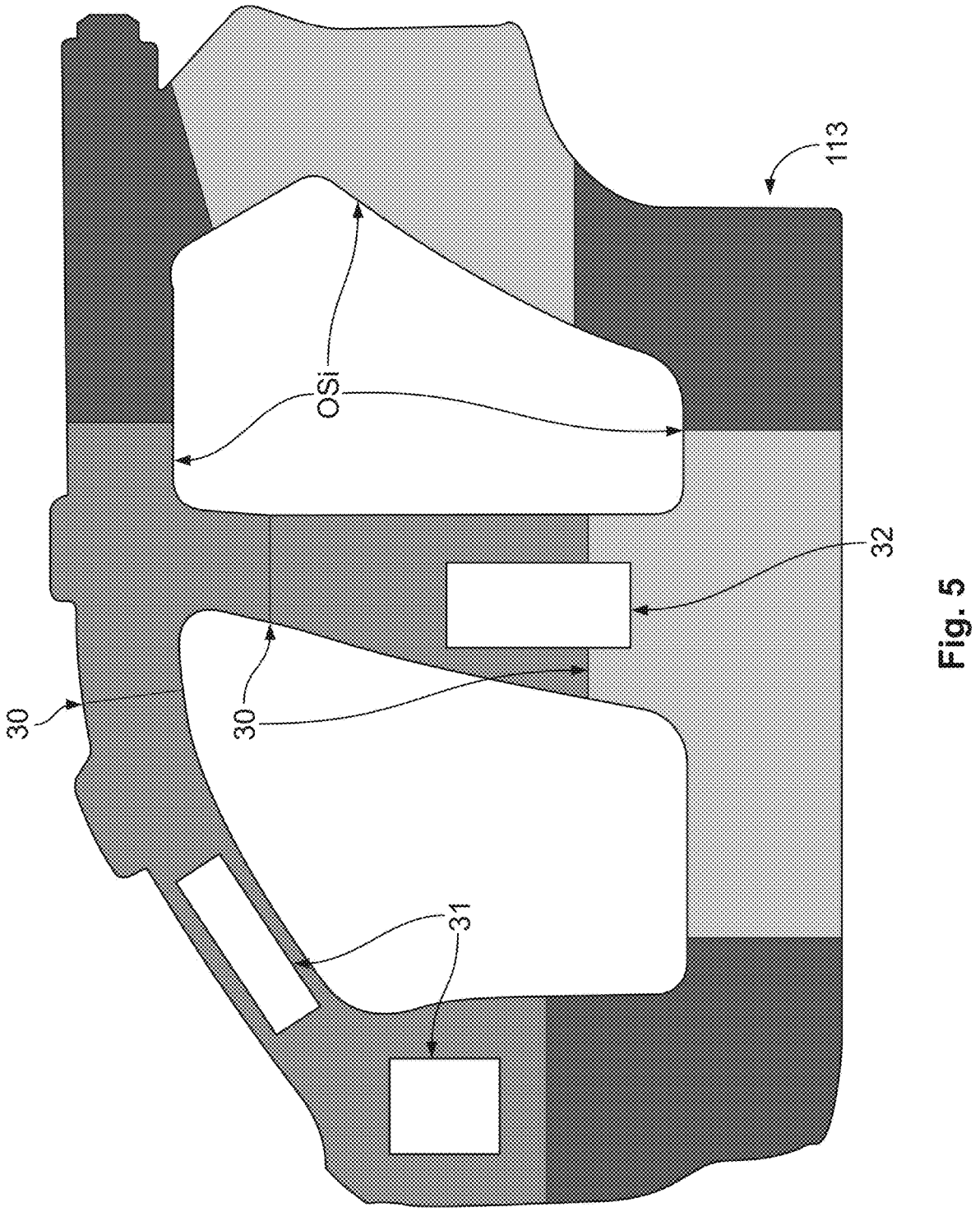
FIG. 5 is a top view of a blank used to form an outer frame according to the invention

Referring to FIGS. 4 and 5, the inner and outer frames 11, 13 (shown in FIGS. 6 and 7 respectively) are each formed by stamping a single blank of steel, respectively an inner and outer frame blank 111, 113. Using a single blank of steel to produce each part yields multiple benefits from the point of view of manufacturing, structural resistance and weight reduction. On the manufacturing side, it means that there is only one forming step and no assembly steps of individual sub parts. This allows to increase productivity and to increase the geometrical precision of the inner and outer frame 11, 13. Indeed, the geometrical tolerances on individual parts are added up to calculate the geometrical tolerance of an assembly. In the current case there is no addition of individual parts geometrical tolerances. Furthermore, there is no problem of assembly tolerance between individual parts. The use of a single blank also allows for an increase in part resistance because there is no risk of rupture at the assembly joints between sub-parts in the case of an impact exerting forces on the inner and outer frames 11, 13. Also, in the case of a load being exerted on the inner and outer frame, there is excellent energy transmission and diffusion within the inner and outer frame, which ensures an optimal crash energy management. Furthermore, the fact that the inner and outer frames 11, 13 are each made of a single part means that there are no overlapping areas for assembly between sub-parts within the inner and outer frames 11, 13—this absence of overlap allows for weight reduction of the parts.

Referring to FIGS. 4 and 5, the inner and outer frame blanks 111, 113 are tailor welded blanks made from steel. Tailor welded blanks are made by assembling together, for example by laser welding together, several blanks of steel, known as sub-blanks, in order to optimize the performance of the part in its different areas, to reduce overall part weight and to reduce overall part cost. The inner frame blank 111 is made by assembling together n inner sub-blanks IS1, IS2, . . . IS$i$ . . . IS$n$, n being an integer strictly greater than 1. Each inner and outer sub-blank IS$i$, OS$i$ having a thickness before hot stamping and an ultimate tensile strength after hot stamping. The series of inner sub-blanks IS$i$ comprises at least two sub-blanks having two different thicknesses. The series of inner sub-blanks IS$i$ comprises at least two sub-blanks having two different tensile strength after hot stamping. The outer frame blank 113 is made by assembling together m outer sub-blanks OS1, OS2, . . . OS$i$ . . . OS$m$, m being an integer strictly greater than 1. The series of outer sub-blanks OS$i$ comprises at least two sub-blanks having two different thicknesses. The series of outer sub-blanks OS$i$ comprises at least two sub-blanks having two different tensile strength after hot stamping.

The sub-blanks are assembled together by welding along weld lines 30. The weld lines 30 are materialized by black lines on FIGS. 4 and 5 depicting specific embodiments of the inner and outer frame blanks 111, 113. They are materialized by white lines on FIGS. 6 and 7 depicting specific embodiments of the inner and outer frames 11, 13.

It should be understood that the positioning of the weld lines 30 does not necessarily coincide with the above described different portions of the inner and outer frames 11, 13. Indeed, the vehicle designer will place different sub-blanks having different thickness and different steel grades with different material strength in the appropriate areas to optimize the crash resistance, stiffness and weight of the part. This optimal location of said weld lines 30 does not necessarily correspond to the above described limits between portions of the inner and outer frames 11, 13. For example, as depicted on FIG. 7, the outer frame roof rail portion 13RR comprises material from three different sub-blanks.

The use of tailor welded blanks allows the use of sub-blanks having different material thickness and different strength, which allows optimization of the performance of the part. By placing thicker, higher strength material in areas needing high resistance, such as for example in the blanks involved in the side structure B-pillar upper 1BU, and by placing thinner, lower strength material in areas needing less resistance, it is possible to design a part having optimal resistance while exhibiting an optimized overall weight. Furthermore, it is possible to reduce the manufacturing scrap by using tailor welded blanks for the inner and outer blanks 111, 113. When using a monolithic blank, rather than a tailor welded blank, the large openings in the inner and outer frame blanks 111, 113 corresponding to the doors 8, 10, would need to be cut out from the blank and scrapped. Using tailor welded blanks, it is possible to use nearly rectangular blanks, which are optimal for scrap minimization, or blanks having complementary left/right shapes, in order to have a good nesting when cutting them from a steel coil. Minimizing the scrap enables minimization of the cost of the final part, while also improving the environmental footprint of the part production.

The inner and outer frames 11, 13 are manufactured by hot stamping the inner and outer frame blanks 111, 113. Hot stamping is a forming technology which involves heating a blank up to a temperature at which the microstructure of the steel has at least partially transformed to austenite, forming the blank at high temperature by stamping it and quenching the formed part to obtain a microstructure having a very high strength. Hot stamping allows one to obtain very high strength parts with complex shapes and no springback. In order to yield the described benefits of hot stamping, the material used is known as press-hardening material, which has a chemical composition allowing it to form the desired hardened microstructure when submitted to the above described hot stamping process. It should be understood that the thermal treatment to which a part is submitted includes not only the above described thermal cycle of the hot stamping process itself, but also a subsequent paint baking step, performed after the part has been painted in order to bake the paint. The mechanical properties of hot stamped parts below are those measured after the paint baking step, in case a paint baking step has indeed been performed.

The inner and outer frames 11, 13 are large parts, covering the entire length and height of the vehicle and having complex shapes. If there is any issue of springback after forming of the parts, there would be warping, distortions and generally bad geometrical tolerances which would make it difficult to assemble the parts together and to the rest of the vehicle. By using hot stamping, it is possible to manufacture the inner and outer frames 11, 13 with high geometrical accuracy and no or very little springback issues.

By using tailor welded blanks which are hot stamped to form the inner and outer frames 11, 13, it is possible to design the parts so that they have very important differences in thickness and strength in the different areas of the parts. It is generally considered that a good indicator of the resistance to intrusion and of the capacity to absorb energy is given by the product of its ultimate tensile strength after hot stamping by its thickness before stamping.

Considering that the inner frame blank 111 is composed of a series of n inner sub-blanks IS1, IS2, . . . , IS$i$, . . . IS$n$, wherein each inner sub-blank IS$i$ has a thickness before hot stamping $t_i$ and an ultimate tensile strength after hot stamping $TS_i$, wherein the product $P_i = t_i * TS_i$ is computed for each inner sub-blank IS$i$, it is possible to select a minimum resistance inner sub-blank ISmin having a minimum product Pmin of all inner sub-blanks IS$i$ and a maximum resistance inner sub-blank ISmax having a maximum product Pmax of all inner sub-blanks IS$i$. In a particular embodiment, the maximum product Pmax will be significantly different from the minimum product Pmin. Advantageously, this will mean that the part will have very different resistance levels at different areas of the part, and thus an optimal distribution of weight and resistance according to the area of the part. For example, Pmax is advantageously at least twice as high as Pmin (in other words, Pmax>2*Pmin).

Considering that the outer frame blank 113 is composed of a series of m outer sub-blanks OS1, OS2, OSi, . . . OSm, wherein each outer sub-blank OSi has a thickness before hot stamping ti and an ultimate tensile strength after hot stamping TSi, wherein the product $Pi=ti*TSi$ is computed for each outer sub-blank OSi, it is possible to select a minimum resistance outer sub-blank OSmin having a minimum product Pmin of all outer sub-blanks ISi and a maximum resistance outer sub-blank OSmax having a maximum product Pmax of all outer sub-blanks OSi. In a particular embodiment, the maximum product Pmax will be significantly different from the minimum product Pmin. Advantageously, this will mean that the part will have very different resistance levels at different areas of the part, and thus an optimal distribution of weight and resistance according to the area of the part. For example, Pmax is advantageously at least twice as high as Pmin (in other words, Pmax>2*Pmin).

For example, the inner frame 111 or the outer frame 113 comprise at least one sub-blank made of a press-hardening steel having an ultimate tensile strength greater than 1800 MPa after hot forming.

For example, the steel composition of said sub-blank comprises, in % weight: 0.24%≤C≤0.38%, 0.40%≤Mn≤3%, 0.10%≤Si≤0.70%, 0.015%≤Al≤0.070%≤Cr≤2%, 0.25%≤Ni≤2%, 0.015%≤Ti≤0.10%, Nb≤0.060% 0.0005%≤B≤0.0040%, 0.003%≤N≤0.010%, S≤0,005%, P≤0.025%, %, the remainder being iron and unavoidable impurities resulting from the elaboration. With this composition range, the ultimate tensile strength of the part in the area corresponding to said sub-blank after press-hardening is higher than 1800 MPa. For example, said sub-blank is made of Usibor® 2000.

For example, the inner frame 111 or the outer frame 113 comprise at least one sub-blank made of a press-hardening steel having a tensile strength greater than 1300 MPa after hot forming.

For example, the steel composition of said sub-blank comprises in % weight: 0.20%≤C≤0.25%, 1.1%≤Mn≤1.4%, 0.15%≤Si≤0.35%,≤Cr≤0.30%, 0.020%≤Ti≤0.060%, 0.020%≤Al≤0.060%, S≤0.005%, P≤0.025%, 0.002%≤B≤0.004%, the remainder being iron and unavoidable impurities resulting from the elaboration. With this composition range, the ultimate tensile strength of the part in the area corresponding to said sub-blank after press-hardening is comprised between 1300 MPa and 1650 MPa and the yield strength is comprised between 950 MPa and 1250 MPa. For example, said sub-blank is made of Usibor® 1500.

For example, the inner frame 111 or the outer frame 113 comprise at least one sub-blank having a steel composition which comprises in % weight: 0.06%≤C≤0.1%, 1%≤Mn≤2%, Si≤0.5%, Al≤0.1%, 0.02%≤Cr≤0.1%, 0.02%≤Nb≤0.1%, 0.0003%≤B≤0.01%, N≤0.01%, S≤0.003%, P≤0.020% less than of Cu, Ni and Mo, the remainder being iron and unavoidable impurities resulting from the elaboration. With this composition range, the yield strength of this of the part in the area corresponding to said sub-blank after press-hardening is comprised between 700 and 950 MPa, the ultimate tensile strength between 950 MPa and 1200 MPa and the bending angle is above 75°. For example, said sub-blank is made of Ductibor® 1000.

For example, the inner frame 111 or the outer frame 113 comprise at least one sub-blank corresponding to an area of the final inner or outer frame 11, 13 having an ultimate tensile strength comprised between 1350 MPa and 1650 MPa, a yield strength between 1000 MPa and 1300 MPa and a bending angle above 70°.

For example, the inner frame 111 or the outer frame 113 comprise at least one sub-blank corresponding to an area of the final inner or outer frame 11, 13 having an ultimate tensile strength comprised between 1500 MPa and 1800 MPa, a yield strength between 1250 MPa and 1500 MPa and a bending angle above 70°.

Figure 8A:
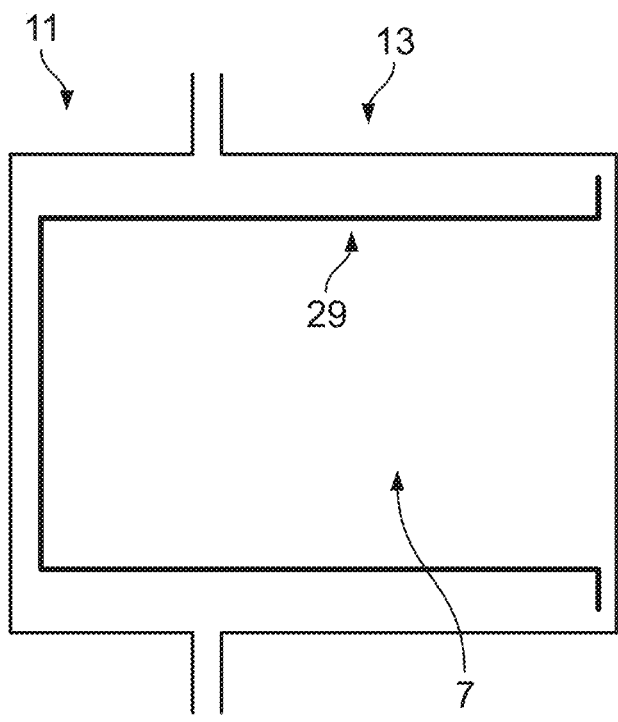
FIGS. 8*a* and 8*b* are schematic examples of cross sections according to any given plane perpendicular to the inner perimeter of the side structure according to the invention, said inner perimeter being outlined by the dashed line 33 of FIG. 2.
Figure 8B:
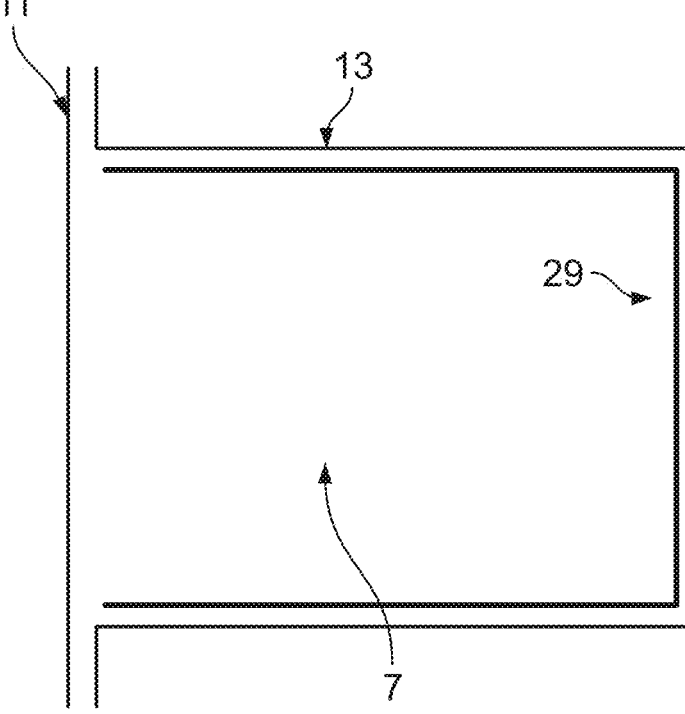

Thanks to the use of tailor welded blanks and of the hot stamping technology, it is possible to obtain very high strength inner and outer frames 11, 13, having optimized resistance in the different areas of said parts and having a very good geometric tolerance despite their large size and very high strength. The inner and outer frames 11, 13 are assembled together around their periphery, including around the inner peripheries at the openings corresponding to the doors 8, 10. The assembly is performed for example by spot welding. The inner and outer frames are designed with shapes such that they form between one another when assembled a hollow volume 7, as depicted on FIGS. 8a and 8b. FIGS. 8a and 8b depict simplified cross-sections of the inner and outer frame 11, 13 assembly along any plane extending perpendicular to the side structure inner perimeter, which is schematically defined by the dashed line labelled 33 in FIG. 2. Said hollow volume 7 provides excellent torsional rigidity to the side structure 1, which in turns contributes to increasing the overall rigidity of the vehicle body. This configuration also allows efficient resistance to lateral impacts. The inertia provided by the hollow volume 7 provides good resistance to the forces generated by a side impact. Furthermore, thanks to the isotropic nature of steel, the side structure 1, with its hollow volume 7, will also have good resistance and good energy absorption capacities in the case of a front or rear crash, which will exert forces on the side structure 1 in the longitudinal direction. In this case, the fact that both the inner and outer frame are made from one single blank means that there is no risk of rupture in between the subparts making up the assembly of the inner and outer frame structures. Indeed, the longitudinal force of the crash would result in shearing forces being exerted on the assembly points, which is a critical configuration for the resistance of assemblies. Furthermore, the inner and outer frames 11, 13 are assembled to one another along their respective perimeters, i.e. along a very large area. This guarantees a good cohesion between the two frames and therefore also lowers the risk of decohesion in the case of front impact.

The above described design, involving the use of hot stamping two tailor welded blanks to form the inner and outer frames 11, 13 and assembling them to form a hollow volume 7 which surrounds the entire perimeter of the side structure 1, has the further advantage of providing very good crash resistance to the C-pillar upper and lower portions 1CU, 1CL. This allows to better protect the occupants of the rear seats of the vehicle. It also anticipates the fact that safety regulations are constantly evolving in the direction of more strict requirements. The resistance of the C-pillar area is not a main focus of the safety tests today, but might become so in the near future.

In a particular embodiment, in areas needing additional rigidity or additional resistance to impacts, a reinforcement 29 is provided within the hollow volume 7. Said reinforcement 29 can have different cross-sections, as depicted in the schematic examples of FIGS. 8a and 8b. For example, the reinforcement 29 has a general U shape, the bottom of which is attached to the outer frame's 13 outermost wall (FIG. 8b).

In another example, the reinforcement 29 has a general omega shape, the bottom part of which can be used as flanges to attach it to the outer frame's 13 outermost wall (FIG. 8a). The reinforcement 29 is for example attached to the outer frame 13 by spot welding.

In a particular embodiment, the inner frame blank 111 and/or the outer frame blank 113 comprises at least one sub-blank which is coated with an aluminum-based metallic coating. By aluminum based it is meant a coating that comprises at least 50% of aluminum in weight. For example, the metallic coating is an aluminum-based coating comprising 8-12% in weight of Si. For example, the metallic coating is applied by dipping the base material in a molten metallic bath. Advantageously, applying an aluminum-based metallic coating on the inner frame 111 or the outer frame 113 avoids the formation of surface scale during the heating step of the hot stamping process, which in turns allows production of the parts by hot stamping without a subsequent sand blasting operation. Furthermore, the aluminum-based coating also provides corrosion protection to the part while in service on the vehicle.

In a particular embodiment, the inner frame 111 and/or the outer frame 113 is comprised of at least one sub-blank which is coated with an aluminum-based metallic coating comprising from 2.0 to 24.0% by weight of zinc, from 1.1 to 12.0% by weight of silicon, optionally from 0 to 8.0% by weight of magnesium, and optionally additional elements chosen from Pb, Ni, Zr, or Hf, the content by weight of each additional element being inferior to 0.3% by weight, the balance being aluminum and optionally unavoidable impurities. Advantageously, this type of metallic coating affords very good corrosion protection on the part, as well as a good surface aspect after hot stamping.

In order to manufacture the above described tailor welded blanks having an aluminum-based coating on at least one of its sub-blank, it is possible to use laser welding. It is possible to use sub-blanks on which the edges to be welded have been prepared before-hand by ablating part of the metallic coating. Advantageously, this removes part of the aluminum present in the coating, which would pollute the weld seam and deteriorate its mechanical properties.

In a particular embodiment, the inner frame 111 and/or the outer frame 113 comprises at least one sub-blank which comprises at least one side with an emissivity increasing top layer. Said emissivity increasing top layer is applied on the outermost surface of said sub-blank. Said emissivity increasing top layer allows the surface of said sub blank to have a higher emissivity compared to the same sub-blank which is not coated with said emissivity increasing top layer. Said emissivity increasing top layer can be applied either on the top or the bottom side of a sub-blank. Said emissivity increasing top layer can also be applied on both sides of said sub-blank.

If said sub-blank comprises a metallic coating, such as described previously, the emissivity increasing top layer is applied on top of said metallic coating. Indeed, for the emissivity increasing top layer to increase the emissivity of the surface, it needs to cover the outermost surface of the sub-blank.

Advantageously, said emissivity increasing top layer will allow to increase the heating rate of said sub-blank and therefore increase the productivity of the heating step of the hot stamping process.

In a particular embodiment, the inner and outer sub-blanks ISi, OSi are sorted in the order of increasing thickness. The emissivity increasing top layer is applied on at least one side of the sub-blank having maximum thickness.

In a particular embodiment the emissivity increasing top layer is applied on at least one side of the sub-blank having maximum thickness and the sub-blank having a thickness just below the maximum thickness. In a particular embodiment, the emissivity increasing top layer is applied to the x sub-blanks which have highest thickness, x being an integer superior or equal to 1. Advantageously, by applying the emissivity increasing top layer on the set of higher thickness sub-blanks, it is possible to reach a more homogeneous heating rate during the heating step of the hot stamping process between the higher thickness sub-blanks and the lower thickness sub-blanks. Indeed, the lower thickness sub-blanks will naturally heat faster than the higher thickness sub-blanks, because they are thinner and therefore need less energy to reach the same temperature. By targeting the higher thickness sub-blanks with an emissivity increasing top layer, it is possible to diminish the difference in heating rate between different thickness blanks and therefore to reach a more homogeneous heating rate between higher thickness sub-blanks and lower thickness sub-blanks. Furthermore, by targeting the higher thickness sub-blanks with an emissivity increasing top layer, it is also possible to increase the size of the process window of the heating step of the hot stamping process of the blank. When hot stamping large parts with high thickness differences, one of the concerns is that there will be high differences in the process window (which includes among other parameters the heating time and heating temperature) necessary to reach the desired microstructure and coating properties of the different sub blanks. The process window necessary to achieve the desired properties on the whole blank is the intersection between the process windows of each of the individual sub-blanks. By applying an emissivity increasing top layer on the higher thickness sub-blanks, it is possible to bring closer to one another the process windows of each of the individual sub-blanks and thereby to increase the size of the intersection between the process windows of all the sub-blanks, i.e. to increase the process window of the overall tailor welded blank.

In a particular embodiment, the emissivity increasing top layer has a thickness between 2 microns and 30 microns. In a particular embodiment, it is composed of a polymer that does not contain silicon, that contains more than 1% by weight of nitrogen, and that contains carbon pigments in a quantity between 3 and 30% by weight.

In a particular embodiment, the outer frame blank 113 further comprises at least one metallic patch 31 as depicted on FIG. 5, in order to locally increase the strength of the part. In a particular embodiment, the patch 31 is attached by spot welding. In a particular embodiment, the patch 31 is attached by laser welding. The patch 31 is for example applied in areas that need to be reinforced because of the presence of door hinges, or because of mechanical issues such as folding of the part detected during crash tests.

Generally speaking patches 31 have the advantage of providing very local reinforcements over larger size parts, thus further optimizing the strength and thickness distribution of the overall tailor welded blank and keeping the overall weight and cost of the part low.

Patches 31 are for example made of press-hardening steel. Patches 31 are for example coated with an aluminum based metallic coating.

In a particular embodiment, a patch 31 is coated with an emissivity increasing top layer, in order to yield the above described advantage of increasing the heating rate and therefore decreasing the difference in heating rate in the area of the patch 31 linked to the over thickness of said patch 31.

In a particular embodiment, the patch is applied on an area which includes a portion of weld seam 30. We will refer to it as a weld seam reinforcing patch 32, as depicted on the B-pillar portion of FIG. 5. Such a patch 32 has exactly the same above described features and optional features. Such a patch 32 reinforces the weld seam 30. Weld seams 30 are areas in which there is a discontinuity between two sub-blanks, which leads to a local inertia variation and can result in a plastic hinge type of collapse when submitted to the high loads generated by a crash. Reinforcing a weld seam 30 by a weld seam reinforcing patch 32 can prevent such plastic hinge phenomenon. A weld seam reinforcing patch 32 is for example attached by welding it to the outer frame 13. In a particular embodiment, the attachment points between the weld seam reinforcing patch 32 and the outer frame 13 will not be in the weld seam 30 area, in order not to interfere with the mechanical properties of the weld seam 30.

When using press hardening steel coated with an aluminum based metallic coating for the inner or outer frame blank 111, 113, the hot stamping process induces the formation of an interdiffusion layer between the steel and the metallic coating on the hot formed part. The interdiffusion layer is the result of the cross diffusion at high temperature of Fe coming from the steel and going towards the metallic coating and Al coming from the coating and going towards the steel. The thickness of said interdiffusion layer has been shown to correlate with further in-use properties of the part, such as for example the ability of the part to be successfully assembled to the rest of the body by spot welding. In particular, it has been shown that hot formed parts having an interdiffusion layer thickness which is comprised between 3 microns and 15 microns have good in-use properties. More preferably, it has been shown that hot formed parts having an interdiffusion layer thickness which is comprised between 3 microns and 10 microns have excellent in-use properties.

In a particular embodiment, the thickness of the interdiffusion layer in the aluminum based metallic coated areas of the inner frame 11 is comprised between 3 microns and 15 microns. In a particular embodiment, the thickness of the interdiffusion layer in the aluminum based metallic coated areas of the inner frame 11 is comprised between 3 microns and 10 microns. In a particular embodiment, the thickness of the interdiffusion layer in the aluminum based metallic coated areas of the outer frame 13 is comprised between 3 microns and microns. In a particular embodiment, the thickness of the interdiffusion layer in the aluminum based metallic coated areas of the outer frame 13 is comprised between 3 microns and 10 microns.

The current invention also concerns a process to produce the above described side structure 1 and assemble it to the rest of the vehicle body.

In a particular embodiment, the process consists of the following steps (steps A, B, C and D are listed in no particular order):
    A/ providing an inner frame blank 111
    B/ providing an outer frame blank 113
    C/ hot stamping the inner frame blank 111 to form an inner frame 11
    D/ hot stamping the outer frame blank 113 to form an outer frame 13
    E/ Assembling the inner and outer frames 11, 13 to form a side structure 1
    F/ Attaching the side structure 1 to the body of the vehicle
    G/ Attaching a body side outer 5 to the already assembled side structure 1

Optionally, the process further comprises the step of attaching reinforcements 29 to the outer frame 13 in between steps D and E.

In a particular embodiment, the process consists of the following steps (steps A, B, C and D are listed in no particular order):
    A/ providing an inner frame blank 111
    B/ providing an outer frame blank 113
    C/ hot stamping the inner frame blank 111 to form an inner frame 11
    D/ hot stamping the outer frame blank 113 to form an outer frame 13
    F/ Attaching the inner frame 11 to the body of the vehicle
    E/ Attaching the outer frame 13 to form a side structure 1
    G/ Attaching a body side outer 5 to the already assembled side structure 1

Optionally, the process further comprises the step of attaching reinforcements 29 to the outer frame 13 in between steps D and E.

What is claimed is:

1. A side structure and body side outer for a motor vehicle, the side structure comprising:
    an inner frame and an outer frame, wherein the inner and outer frames each comprise respectively:
        a roof rail portion corresponding to a top part of the side structure bordering a roof of the vehicle;
        a rocker panel portion corresponding to a bottom part of the side structure bordering a floor panel of the vehicle;
        an A-pillar upper portion extending from a front end of the roof rail portion and corresponding to a part of the side structure bordering a windshield of the vehicle;
        an A-pillar lower portion extending from the A-pillar upper portion down to said rocker panel portion;
        a B-pillar upper portion extending in an elevation direction from the roof rail portion in between front and rear doors down to a level of front and rear door windows;
        a B-pillar lower portion extending from the B-pillar upper portion down to the rocker panel portion;
        a C-pillar lower portion extending from a rear end of said rocker panel portion behind the rear door and up to the level of the rear door window in the elevation direction; and
        a C-pillar upper portion extending from the C-pillar lower portion up to the roof rail portion,
    wherein the inner and outer frames each form a closed ring having two openings corresponding to the front and rear doors;
    wherein the inner and outer frames are each formed by hot stamping respectively an inner and an outer frame blank, the inner and outer frame blanks each being a single blank made of steel;
    wherein the inner and outer frame blanks are tailor welded blanks composed respectively of n inner sub-blanks and m outer sub-blanks, n and m being integers strictly greater than 1,
    wherein the inner sub-blanks include at least two inner sub-blanks having a different thickness before hot stamping and comprise at least two inner sub-blanks having a different tensile strength after hot stamping,
    wherein the outer sub-blanks include at least two outer sub-blanks having a different thickness before hot stamping and comprise at least two outer sub-blanks having a different tensile strength after hot stamping, and wherein the inner and outer frames are assembled to form a hollow volume therebetween.

2. The side structure and body side outer as recited in claim 1 wherein the inner and outer frame blanks each include respectively at least one inner and outer sub-blank coated with an aluminum based metallic coating.

3. The side structure and body side outer as recited in claim 1 wherein the outer frame blank includes at least one outer sub-blank coated with an aluminum based metallic coating, comprising from 2.0 to 24.0% by weight of zinc, from 1.1 to 12.0% by weight of silicon, optionally from 0 to 8.0% by weight of magnesium, and optionally additional elements chosen from Pb, Ni, Zr, or Hf, the content by weight of each additional element being inferior to 0.3% by weight, a balance being aluminum and optionally unavoidable impurities.

4. The side structure and body side outer as recited in claim 1 wherein the inner frame blank is composed of a series (IS1, IS2, . . . , ISi, . . . . ISn) of the n inner sub-blanks, wherein each inner sub-blank has a thickness before hot stamping ti and an ultimate tensile strength after hot stamping TSi, wherein the product $Pi=ti*TSi$ is computed for each inner sub-blank, the inner frame blank including:

-a minimum resistance inner sub-blank (ISmin) having a product Pmin, which is the minimum of all products Pi of said n inner sub-blanks, a maximum resistance inner sub-blank (ISmax) having a product Pmax, which is the maximum of all products Pi of said n inner sub-blanks, and wherein $Pmax>2*Pmin$.

5. The side structure and body side outer as recited in claim 1 wherein the outer frame blank is composed of a series (OS1, OS2, . . . , OSi, . . . . OSm) of the m outer sub-blanks, wherein each outer sub-blank has a thickness before hot stamping ti and an ultimate tensile strength after hot stamping TSi, wherein the product $Pi=ti*TSi$ is computed for each outer sub-blank, the outer frame blank including:

a minimum resistance outer sub-blank (OSmin) having a product Pmin, which is the minimum of all products Pi of said m outer sub-blanks, a maximum resistance outer sub-blank (OSmax) having a product Pmax, which is the maximum of all products Pi of said m outer sub-blanks, and wherein $Pmax>2*Pmin$.

6. The side structure and body side outer as recited in claim 1 wherein the inner frame blank includes at least one inner sub-blank including an emissivity increasing top layer on at least one side.

7. The side structure and body side outer as recited in claim 1 wherein the outer frame blank includes at least one outer sub-blank including an emissivity increasing top layer on at least one side.

8. The side structure and body side outer as recited in claim 1 wherein the inner frame blank includes at least one inner sub-blank made of a press-hardening steel having an ultimate tensile strength after hot stamping above 1800 MPa.

9. The side structure and body side outer as recited in claim 1 wherein the outer frame blank includes at least one outer sub-blank made of a press-hardening steel having an ultimate tensile strength after hot stamping above 1800 MPa.

10. The side structure and body side outer as recited in claim 1 wherein the inner frame blank includes at least one inner sub-blank made of a press-hardening steel having a yield strength after hot forming comprised between 700 and 950 MPa, an ultimate tensile strength after hot forming comprised between 950 MPa and 1200 MPa and a bending angle after hot forming above 75°.

11. The side structure and body side outer as recited in claim 1 wherein the outer frame blank includes at least one outer sub-blank made of a press-hardening steel having a yield strength after hot forming comprised between 700 and 950 MPa, an ultimate tensile strength after hot forming comprised between 950 MPa and 1200 MPa and a bending angle after hot forming above 75°.

12. The side structure and body side outer as recited in claim 1 wherein the outer frame blank includes at least one metallic patch.

13. The side structure and body side outer as recited in claim 12 wherein at least one metallic patch of the outer frame blank includes an emissivity increasing top layer.

14. The side structure and body side outer as recited in claim 1 wherein the outer frame blank includes at least one weld seam reinforcing patch, wherein the weld seam reinforcing patch is applied on an area including a weld seam.

15. The side structure and body side outer as recited in claim 14 wherein at least one weld seam reinforcing patch of the outer frame blank includes an emissivity increasing top layer.

16. The side structure and body side outer as recited in claim 1 wherein the inner frame has aluminum based metallic coated areas and a thickness of an interdiffusion layer in the aluminum based metallic coated areas of the inner frame is between 3 microns and 15 microns.

17. The side structure and body side outer as recited in claim 1 wherein the outer frame has aluminum based metallic coated areas and a thickness of an interdiffusion layer in the aluminum based metallic coated areas of the outer frame is between 3 microns and 15 microns.

* * * * *